Inventor,
James F. Overman,
By Joseph A. Minturn,
Attorney.

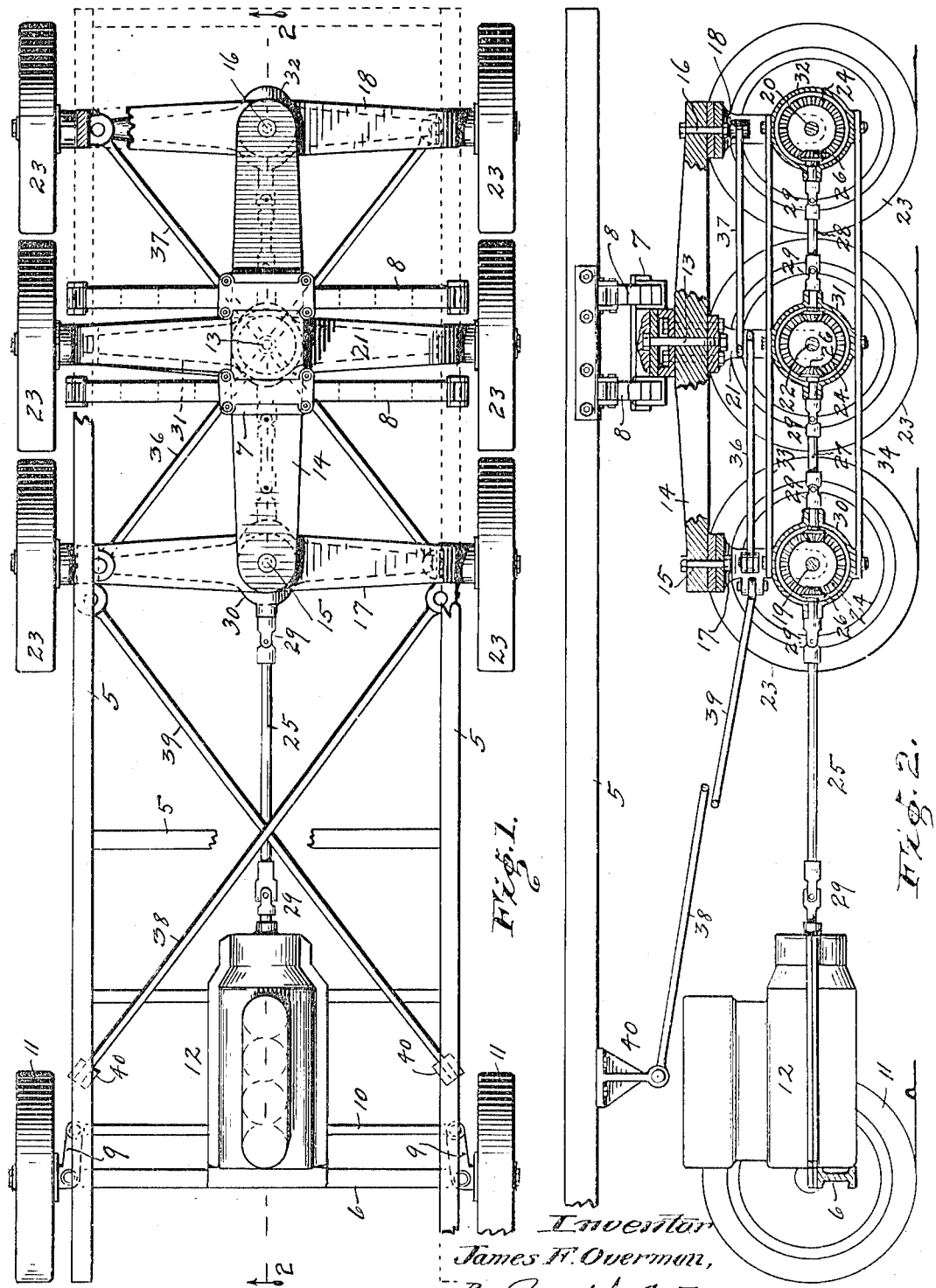

UNITED STATES PATENT OFFICE.

JAMES F. OVERMAN, OF WILKINSON, INDIANA.

MOTOR VEHICLE.

1,402,175.  Specification of Letters Patent.  Patented Jan. 3, 1922.

Application filed October 11, 1920. Serial No. 416,102.

*To all whom it may concern:*

Be it known that I, JAMES F. OVERMAN, a citizen of the United States, residing at Wilkinson, in the county of Hancock and State of Indiana, have invented new and useful Improvements in Motor Vehicles, of which the following is a specification.

The object of this invention is to provide more driving wheels than the usual number of two, for municipal and cross-country trucks in order to increase the traction and pulling power of such motor vehicles, and also to distribute the load over more points of support, whereby the wear on the tires of the vehicle and on the roadway itself will be reduced.

The object, also, is to provide a simple direct drive by means of a propeller shaft from the engine to the axles of the driving wheels of the truck; to flexibly mount the front steering wheels as is usual under present conditions, and to automatically control the shifting in angular relation to each other of the axles of the driving wheels by the movement of the truck-frame as it in turn follows the front wheels as the latter are manually changed in the usual operation of steering.

I accomplish the above, and other objects which will hereinafter appear, by the mechanism illustrated in the accompanying drawings, in which—

Figure 3:
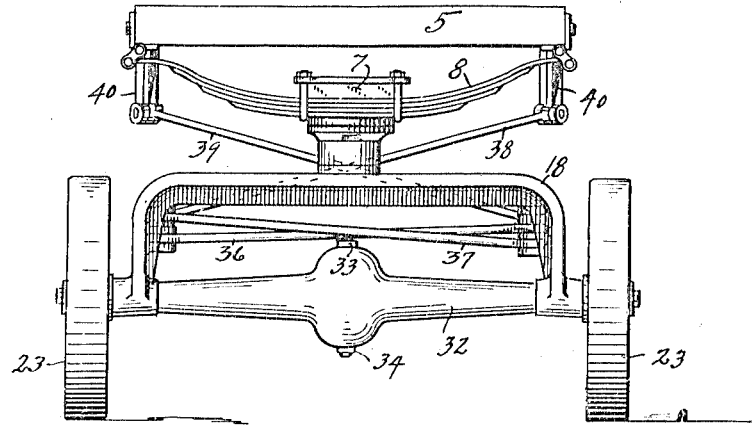
Figure 4:
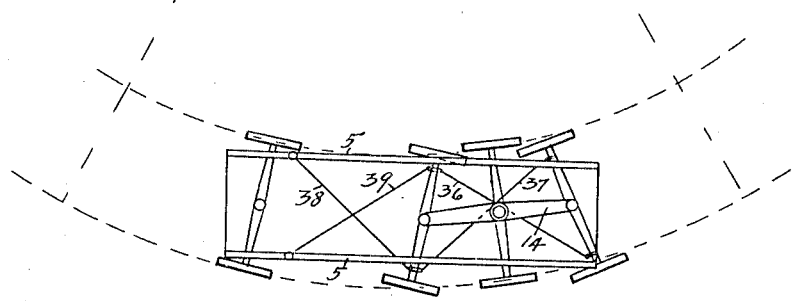
Figure 5:
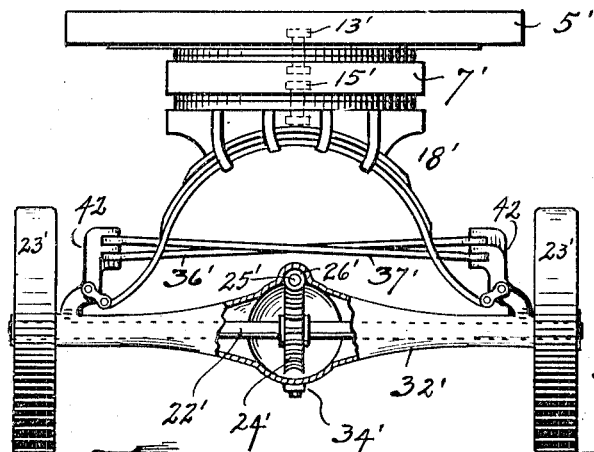

Fig. 1, is a top plan view of a truck-chassis having eight wheels six of which are drivers, and the controlling and driving means employed in accordance with my invention. Fig. 2 is a horizontal vertical section on the line 2—2 of Fig. 1. Fig. 3 is a rear end elevation of the mechanism shown in Fig. 1, and Fig. 4 is a diagrammatic top plan view showing the positions of the wheels and axles of the truck in moving around a curve. Fig. 5 is an end elevation of a modified form of transverse bolster and power transmission.

Like characters of reference indicate like parts in the several views of the drawings.

The main frame 5 of the truck is of any usual and suitable construction, the front end of which is supported from the front axle 6 by the usual means, such as springs (not shown), and from a block 7 near its rear end by the leaf springs 8, 8. The steering knuckles 9, 9, are pivoted to the front axle and are connected by the parallel rod 10. Wheels 11, 11, are mounted on the steering knuckles. A motor 12, is appropriately mounted from the frame 5.

The block 7 rests upon a fifth-wheel which is connected by a king-pin 13 with a longitudinal bolster 14. Each end of this bolster bears upon a fifth-wheel and the latter are respectively connected by king-pins 15 and 16, with transverse bolsters 17 and 18. The ends of these bolsters are bent down (see Fig. 3) and terminate with appropriate boxes through which axles 19 and 20 pass. In the form here shown, a third transverse bolster 21, is connected with the longitudinal bolster 14, but in this case the connection is rigid whereby the two bolsters 14 and 21 will move together. The ends of bolster 21 are bent down and terminate with boxes through which an axle 22 is assembled. On the ends of axles 19, 20 and 22 traction wheels 23 are mounted in a fixed manner to rotate with their respective axles.

Mounted rigidly on each axle 19, 20 and 22, are the respective bevel-wheels 24, and a rotary drive is communicated from the motor 12 to the wheel 24 on the front axle 19, by means of a propeller shaft 25 and bevel-pinion 26. Propeller-shaft extensions 27 and 28, each with similar pinions 26 on each end, drivingly connect the bevel-wheels 24 on axles 20 and 22 with the wheel 24 on axle 19. Flexible joins 29 are appropriately provided in all of the said propeller shafts to make the drive operative when the angular positions of the axles 19, 20 and 22 are changed by the movement of the truck around curves in the roadway traversed. The axles 19, 20 and 22 and the bevel gears of each axle are respectively protected by housings 30, 31 and 32, and these housings are strengthened and braced together by tie-bars 33 and 34, which do not interfere with the freedom of movement of the axles because the attachments of the bars with the housings are all in vertical alinement with adjacent superimposed king-pins.

The propeller shaft 25 and its extensions 27 and 28 have the usual sliding adjustment in corresponding members of the flexible joints to allow for the lengthening and shortening of the distances which the shafts connect through at different angular variations of the axles.

The bolster 17 and 18 have eyes to which diagonal rods 36 and 37 are connected by pivot bolts through corresponding eyes in the ends of the rods, whereby, when bolster 17 is moved about king-pin 15 the bolster 18 will be correspondingly moved but in an opposite direction. The front bolster 19 is connected with the main frame 5 by the diagonal rods 38 and 39, in a manner similar to the way in which the rods 36 and 37 are connected, except that I preferably provide hangers 40 which are bolted to the frame 5, with eyes in the hangers to which the rods are pivoted. This preferred construction is to lower the points of attachment in front of rods 38 and 39 nearer to the level of their attachment to bolster 17.

Cables or other flexible ties may be substituted for the diagonal rods, and the axle and wheels and bolster 21 of the truck-members between bolsters 17 and 18 may be omitted if desired without departing from the spirit of this invention.

The operation of my invention is as follows:

When the front wheels are manually turned by moving the steering knuckles of Fig. 1 or the front axle as in Fig. 4, the front end of the body 5 correspondingly follows their lead and the body turns about king-pin 13 as a center and thereupon the diagonal rod 38 in the diagram of Fig. 4, swings the front bolster 17 about king-pin 15 and the rod 37 swings the rear bolster 18 about king-pin 16, all in suitable positions to cause the vehicle to make the curve properly and without interfering with the power transmission from the motor to the axles through the propeller shafts and gears. The middle bolster 21 by being rigidly connected with the longitudinal bolster 14 is controlled in its position by bolster 14.

In the modification shown in Fig. 5, power is transmitted from the propeller shaft 25' by mounting thereon a worm 26' which drivingly engages a worm wheel 24' mounted on the axle 22', in a manner quite common in truck construction, and instead of forming the transverse bolsters of rigid material in rigid assembly with the axles, I substitute the leaf spring as shown suspended by shackles from brackets 42 and a head block clipped to the crown of the spring. A fifth wheel is supported on the head block and pivoted on king pin 15' and supports the longitudinal bolster 7' which is connected with the body of the truck 5' by a fifth wheel united by the king pin 13'.

My construction provides a greater wheel base than is possible with the four-wheeled vehicles now in use, it has more points of contact with the roadway, effects a saving in tires and the rear pivoted axles are properly and automatically directed by connection with and movement of the main frame of the vehicle; and while I have thus described the principle of operation of the invention, together with the embodiment thereof, I desire to have it understood that the device shown is merely illustrative, and that such changes as I have indicated, together with all others as are within the scope of the claims appended hereto, may be made.

Having thus fully described my invention what I claim as new and wish to sceure by Letters Patent, is—

1. In a motor vehicle having a plurality of axles, wheels rigidly mounted on all but the front axle, a main frame, a power plant thereon, means permitting the rear axles to swing relative to the main frame, means including cross connections associating said rear axles in a group that have wheels rigidly mounted on them, cross connections connecting the group with the main frame so the movement of the main frame will swing the group relative to the frame, and means for driving the axles of the group from the power plant.

2. In a motor vehicle having two front wheels and a plurality of axles to the rear of said front wheels, wheels rigidly mounted on said rear axles, a main frame, cross connections connecting the rear axles in a group, and cross connections connecting the group with the frame whereby a lateral movement of the frame will move the wheels of the group on one side of the vehicle in an arc and the wheels on the opposite side in a concentric arc and power means for driving one or more of said rear axles.

3. In a motor vehicle having a plurality of axles with wheels mounted thereon and arranged in two groups, one in advance of the other, a main frame, cross connections connecting the rear group with the main frame so a lateral movement of the frame will move said group relative to the frame, and means comprising cross connections connecting the axles of this group so the wheels on one side will follow an arc and the wheels on the opposite side a concentric arc and power means for driving one or more of said rear axles.

4. In a vehicle having two front wheels and a plurality of axles to the rear of said front wheels, wheels rigidly mounted on said rear axles, a main frame relative to which the axles are adapted to swing, means comprising cross connections connecting the plurality of rear axles in a group and automatically positioning the wheels on one side of the group in an arc and those on the other side in a concentric arc by the lateral movement of the front end of the frame, cross connection connecting one of the rear axles with the main frame, and power means for driving one or more of said rear axles.

5. In a vehicle, a main frame, manually controlled steering wheels mounted beneath the forward end, a bolster pivotally mounted under and longitudinally of the body, a transverse bolster pivotally mounted under each end of said longitudinal bolster, an axle connected with each transverse bolster, wheels mounted on the axles, cross connections between the two axles, and cross connections between one of the axles and the main frame.

6. In a vehicle, a main frame, a motor, manually controlled steering wheels mounted beneath the front end of the frame, a bolster pivotally mounted under and longitudinally of the frame, a transverse bolster pivotally mounted under each end of said longitudinal bolster, an axle connected with each transverse bolster, wheels mounted in a fixed manner on the axles, cross connections between the axles, cross connections between one of the axles and the main frame, and driving mechanism from the motor to the axles.

7. In a vehicle, a main frame, a motor, manually controlled steering wheels mounted beneath the front end of the frame, a bolster pivotally mounted under and longitudinally of the frame, a transverse bolster pivotally mounted under each end of said longitudinal bolster, an axle connected with each transverse bolster, a housing surrounding each axle, wheels mounted in a fixed manner on the axles, cross connections between one of the axles and the main frame, cross connections between the axles, driving mechanism from the motor to the axles, and connecting bars pivoted to and connecting the middles of the housings.

8. In a vehicle, a main frame, a motor, manually controlled steering wheels mounted beneath the front end of the frame, a bolster pivotally mounted under and longitudinally of the frame, a transverse bolster pivotally mounted under each end of said longitudinal bolster, a transverse bolster between the other two rigidly secured to the longitudinal bolster, an axle connected with each transverse bolster, wheels mounted in a fixed manner on the axles, cross connections between the axles, cross connections between the front axle and main frame, and driving mechanism from the motor to the axles comprising propeller shafts and gear wheels.

Signed at Indianapolis, Indiana, this the 5th day of October, 1920.

JAMES F. OVERMAN.